United States Patent
Tsai

(10) Patent No.: US 8,497,877 B2
(45) Date of Patent: Jul. 30, 2013

(54) ELECTRONIC DEVICE AND METHOD OF SWITCHING DISPLAY IMAGES

(75) Inventor: Teng-Yu Tsai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 726 days.

(21) Appl. No.: 12/719,824

(22) Filed: Mar. 8, 2010

(65) Prior Publication Data

US 2011/0181609 A1    Jul. 28, 2011

(30) Foreign Application Priority Data

Jan. 26, 2010    (CN) .......................... 2010 1 0300748

(51) Int. Cl.
*G09G 5/00* (2006.01)
*G09G 5/02* (2006.01)
(52) U.S. Cl.
USPC .......................................... 345/640; 345/592

(58) Field of Classification Search
USPC ................................ 345/589, 592, 629, 630
See application file for complete search history.

(56) References Cited

U.S. PATENT DOCUMENTS

| | | | | |
|---|---|---|---|---|
| 5,473,737 A | * | 12/1995 | Harper | 345/592 |
| 6,058,459 A | * | 5/2000 | Owen et al. | 711/151 |
| 7,561,874 B2 | * | 7/2009 | Wang et al. | 455/418 |

* cited by examiner

*Primary Examiner* — Ryan R Yang
(74) *Attorney, Agent, or Firm* — Altis Law Group, Inc.

(57) ABSTRACT

A method of switching display images on an electronic device is disclosed. The method includes displaying a first image on a display. A predetermined number of steps are set. Display effect percentages of the first image and a second image are computed in each step. The number of step images is generated according to the corresponding display effect percentages of the first and second images for each step. The display displays the step images in sequence. The display then displays the second image.

13 Claims, 3 Drawing Sheets

ELECTRONIC DEVICE AND METHOD OF SWITCHING DISPLAY IMAGES

BACKGROUND

1. Technical Field

The present disclosure relates to electronic devices, and particularly to a method of switching display images on an electronic device.

2. Description of Related Art

Electronic devices (such as digital photo frames) typically allow image browsing by touching the display or by a remote control. Images are stored in a flash storage of the electronic device. The electronic device decodes the images and stores the images in a buffer memory for display. When the user switches from one displayed image to next one, the displayed image may disappear and the next image will directly display on the screen. However, in this way, the switch effect of the images may be tedious, and is inconvenient for user.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming languages such as Java, C, or Assembly. One or more software instructions in the modules may be embedded in firmware, such as an EPROM. It is noteworthy, that modules may comprise connected logic units, such as gates and flip-flops, and programmable units such as programmable gate arrays or processors. The modules described herein may be implemented as software and/or hardware modules and may be stored in any type of computer-readable medium or other computer storage device.

Figure 1:
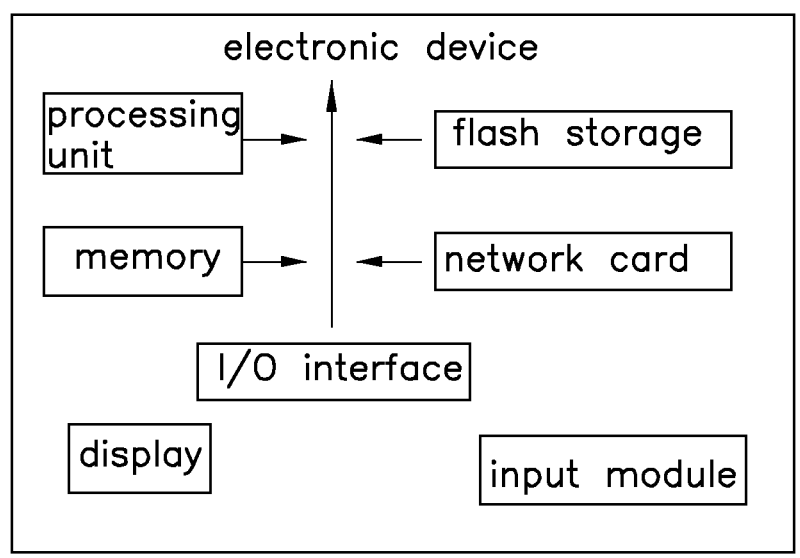
FIG. 1 shows an electronic device in accordance with one embodiment.

Referring to FIG. 1, an electronic device includes a processing unit, a memory, an Input/Output (I/O) interface, a network card, a display, an input module and a flash storage. The display displays a user interface and may be touch-sensitive. The input module may be a remote controller. The electronic device may be a digital photo frame, a media player, or a personal computer.

Figure 2:
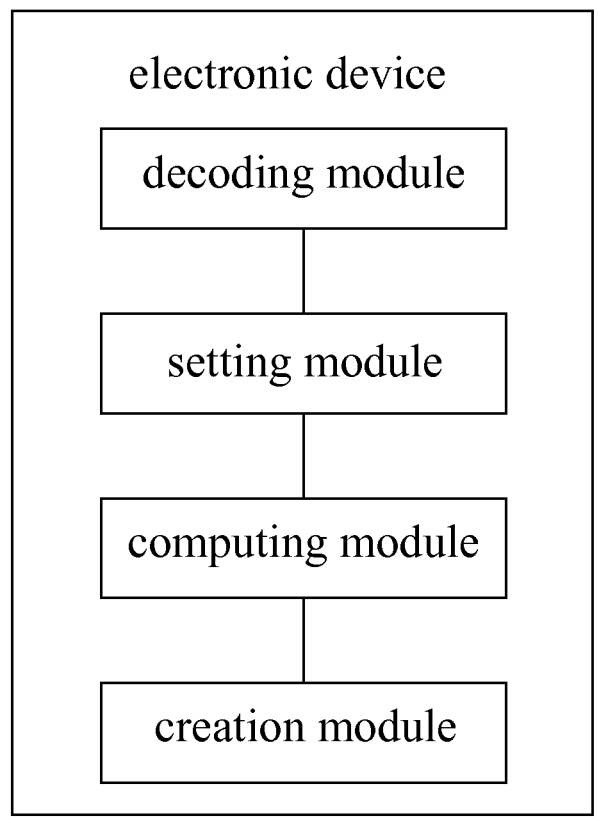
FIG. 2 is a block view of the electronic device in accordance with one embodiment.

Referring to FIG. 2, the electronic device includes a decoding module, a setting module, a computing module and a creation module. The decoding module decodes the second image when the first image is displayed on the display. The setting module sets a step number from the first image to a second image. The computing module computes display effect percentages of the first and second images in each step. In one embodiment, the step number is 6. The display effect percentage of the first image will be 87.5%, 75%, 62.5%, 50%, 37.5%, 25%, and 12.5%. The display effect percentage of the second image will be 12.5%, 25%, 37.5%, 50%, 62.5%, 75%, and 87.5% corresponding to the display effect percentage of the first image. The creation module creates a plurality of step images according to the display effect percentages of the first and second images in each step. The display displays the step images in sequence. The display then displays the second image.

The first and second, step images include a plurality of pixels. Each pixel of each step image is made by the pixels of the first and second images and the corresponding display effect percentages. In one embodiment, x %A+y %B=C. "A" expresses one pixel of the first image. "x %" expresses the display effect percentage of the first image. "B" expresses one pixel of the second image displaying at the same position of the display with one pixel of the first image. "y %" expresses the display effect percentage of the second image. "C" expresses one pixel of the step image displaying at the same position of the display with one pixel of the first image. Each pixel color has red, green, blue (RGB) values. The RGB values of each step image are made by the RGB values of the pixels of the first and second images and the corresponding display effect percentages. The computing module computes the display effect percentages of the first and second images in each step according to the step number. Decreasing the display effect percentage of the first image, increases the display effect percentage of the second image. The sum of the display effect percentage of the first image and the display effect percentage of the second image is one hundred percent in each step. The display effect percentage of the first image decreases gradually. The memory stores each step image.

Figure 3:
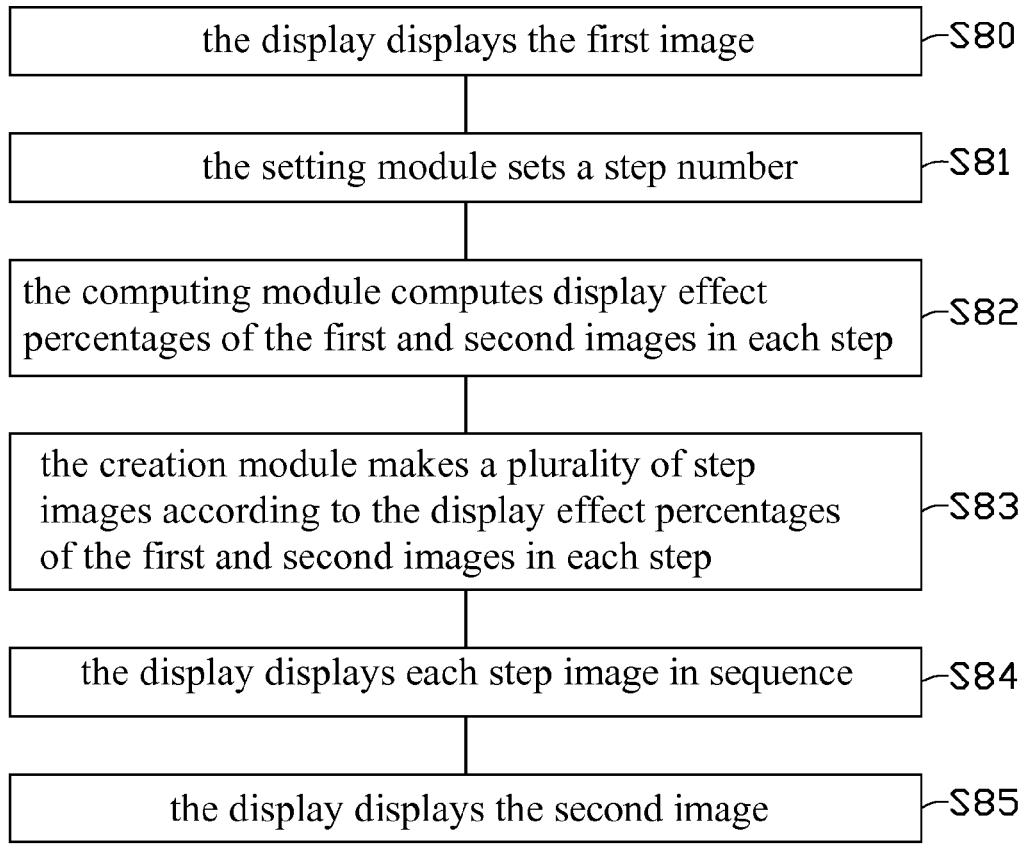
FIG. 3 is a flowchart of a method of switching images on electronic devices such as that of FIG. 1.

Referring to FIG. 3, one embodiment of a method of switching images using an electronic device includes the following blocks.

In block S80, the display displays the first image.

In block S81, the setting module sets a step number.

In block S82, the computing module computes display effect percentages of the first and second images in each step.

In block S83, the creation module makes a plurality of step images according to the display effect percentages of the first and second images in each step.

In block S84, the display displays the step images in sequence.

In block S85, the display displays the second image.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method of switching display images on an electronic device, the method comprising:
    displaying a first image on a display;
    setting a predetermined number of steps;
    computing display effect percentages of the first image and
        a second image in each step according to the number;

generating the number of step images according to the corresponding display effect percentages of the first and second images for each step;

displaying the step images in sequence; and displaying the second image on the display;

wherein the first, second, and step images are represented by a plurality of pixels, each pixel color of each step image is generated according to the corresponding pixels of the first and second images and the corresponding display effect percentages.

2. The method of claim 1, wherein each pixel color is represented by red, green, blue (RGB) values, the RGB values of each pixel color of each step image is calculated by the corresponding RGB values of the pixels of the first and second images and the corresponding display effect percentages.

3. The method of claim 1, wherein the display effect percentage of the first image decreases and the display effect percentage of the second image increases in the step image corresponding to previous step image.

4. The method of claim 1, wherein the sum of the display effect percentage of the first image and the display effect percentage of the second image is one hundred percent in each step.

5. The method of claim 1, wherein the display effect percentage of the first image decreases in the step image corresponding to previous step image.

6. The method of claim 1, wherein the electronic device comprises a memory to store each step image.

7. The method of claim 1, wherein a decode module decodes the second image when the first image is displayed on the display.

8. An electronic device capable of switching display images, the electronic device comprising:

a display capable of displaying a first image;

a setting module capable of setting a predetermined number of steps;

a computing module capable of computing display effect percentages of the first image and a second image in each step according to the predetermined number;

a decoding module capable of decoding the second image when the first image is displayed on the display;

a creation module capable of generating the number of step images according to the corresponding display effect percentages of the first and second images for each step;

the display capable of displaying the step images in sequence;

the display capable of displaying the second image;

wherein the first, second, and step images are represented by a plurality of pixels, each pixel color of each step image is generated according to the corresponding pixels of the first and second images and the corresponding display effect percentages.

9. The electronic device of claim 8, wherein each pixel color is represented by red, green, blue (RGB) values, the RGB values of each pixel color of each step image is calculated by the corresponding RGB values of the pixels of the first and second images and the corresponding display effect percentages.

10. The electronic device of claim 8, wherein the display effect percentage of the first image decreases and the display effect percentage of the second image increases in the step image corresponding to previous step image.

11. The electronic device of claim 8, wherein the sum of the display effect percentage of the first image and the display effect percentage of the second image is one hundred percent in each step.

12. The electronic device of claim 8, wherein the display effect percentage of the first image decreases in the step image corresponding to previous step image.

13. The electronic device of claim 8, wherein the electronic device comprises a memory to store each step image.

* * * * *